US012761055B2

(12) United States Patent
Zhu

(10) Patent No.: US 12,761,055 B2
(45) Date of Patent: Oct. 13, 2026

(54) VIBRONIC SENSING ELEMENT FOR MASS FLOW AND DENSITY MEASUREMENT

(71) Applicant: Endress+Hauser Flowtec AG, Reinach (CH)

(72) Inventor: Hao Zhu, Freising (DE)

(73) Assignee: Endress+Hauser Flowtec AG, Reinach (CH)

( * ) Notice: Subject to any disclaimer, the term of this patent is extended or adjusted under 35 U.S.C. 154(b) by 323 days.

(21) Appl. No.: 18/690,048

(22) PCT Filed: Aug. 12, 2022

(86) PCT No.: PCT/EP2022/072689
§ 371 (c)(1),
(2) Date: Mar. 7, 2024

(87) PCT Pub. No.: WO2023/036558
PCT Pub. Date: Mar. 16, 2023

(65) Prior Publication Data

US 2024/0385021 A1 Nov. 21, 2024

(30) Foreign Application Priority Data

Sep. 9, 2021 (DE) ..................... 10 2021 123 412.3

(51) Int. Cl.
*G01F 1/84* (2006.01)

(52) U.S. Cl.
CPC .......... *G01F 1/8422* (2013.01); *G01F 1/8413* (2013.01); *G01F 1/8418* (2013.01);
(Continued)

(58) Field of Classification Search
CPC .... G01F 1/8422; G01F 1/8431; G01F 1/8477; G01F 1/8472; G01F 1/8413; G01F 1/8418
See application file for complete search history.

(56) References Cited

U.S. PATENT DOCUMENTS 4,823,614 A 4/1989 Dahlin
4,895,031 A * 1/1990 Cage .................... G01F 1/8409 73/861.355

(Continued)

FOREIGN PATENT DOCUMENTS

| | | | |
|---|---|---|---|
| DE | 102015221350 | A1 | 5/2016 |
| DE | 102017012058 | A1 | 7/2019 |
| EP | 0919793 | A2 | 6/1999 |

*Primary Examiner* — Paul M. West
(74) *Attorney, Agent, or Firm* — Mark A. Logan; Endress+Hauser (USA) Holding, Inc.

(57) ABSTRACT

A vibronic sensing element comprises an oscillator with a measuring tube for guiding a medium; an electrodynamic exciter arrangement; sensor arrangements for detecting the bending vibrations of the measuring tube; and a measuring and operating circuit. The exciter arrangement includes a first and a second electrodynamic exciter and a first compensation mass body. The first exciter is configured to exert a force on the measuring tube, and the second electrodynamic exciter is configured to exert a second force on the measuring tube. The measuring and operating circuit is configured to apply a first exciter signal with the eigenfrequency of a symmetric vibration mode only to the first exciter and apply a second exciter signal with the eigenfrequency of an antisymmetric vibration mode only to the second exciter.

16 Claims, 2 Drawing Sheets

(52) U.S. Cl.
CPC .......... *G01F 1/8431* (2013.01); *G01F 1/8472* (2013.01); *G01F 1/8477* (2013.01)

(56) References Cited

U.S. PATENT DOCUMENTS

| | | | | |
|---|---|---|---|---|
| 2007/0095151 | A1 | 5/2007 | Kitami | |
| 2008/0034891 | A1* | 2/2008 | Van Cleve ............ | G01F 1/8422<br>73/861.355 |
| 2015/0377673 | A1 | 12/2015 | Seeley et al. | |

* cited by examiner

VIBRONIC SENSING ELEMENT FOR MASS FLOW AND DENSITY MEASUREMENT

CROSS-REFERENCE TO RELATED APPLICATIONS

The present application is related to and claims the priority benefit of DPMA Patent Application No. 10 2021 123 412.3, filed on Sep. 9, 2021, and International Patent Application No. PCT/EP2022/072689, filed Aug. 12, 2022, the entire contents of which are incorporated herein by reference.

TECHNICAL FIELD

The present invention relates to a vibronic sensing element for mass flow and density measurement with eccentric excitation.

BACKGROUND

The density of a medium guided in the measuring tube is determined by means of a vibronic sensing element on the basis of the eigenfrequencies of vibration modes of the measuring tube. Ideally, the medium is incompressible, so that the medium follows the vibrations of the measuring tube. However, if the medium is compressible, e.g., due to gas content of the medium, the mass flow measurement and the density measurement can be flawed, because the medium begins to oscillate with respect to the measuring tube. The influence of this so-called resonator effect can be corrected by detecting the eigenfrequencies of two vibration modes, wherein, essentially, a sound velocity of the medium is determined for which corresponding density measurement values for the medium result from the two eigenfrequencies. Details on this are disclosed, for example, in DE 10 2015 122 661 A1. The first and second symmetric vibration modes, i.e., the f1 mode and the f3 mode, are usually excited for this purpose. However, in some sensing elements, the eigenfrequency of the second symmetric vibration mode f3 can be high enough that it is within the range of the resonance frequency of the medium, so that a stable excitation of the second symmetric vibration mode cannot be reliably ensured. In this case, the first antisymmetric vibration mode is an attractive alternative, because the eigenfrequency of this mode is lower, and thus a greater distance from the resonance frequency of the measuring tube is to be expected.

The yet unpublished patent application DE 10 2020 123 999.8 discloses a vibronic measuring arrangement having a single, slightly eccentrically arranged exciter, which is suitable for exciting antisymmetric modes in addition to symmetric modes. This fulfills its purpose, but is problematic insofar as excitation also of the first symmetric vibration mode also includes an eccentric portion which causes a zero point error, in particular a damping-dependent zero point error, during flow measurement. Although this zero point error can be determined and can be rectified in a correction, this means additional effort and possibly compromises during operation of the measuring device.

US 2003/0131669 A1 discloses a vibronic sensing element having two eccentrically-arranged exciter arrangements, which are positioned symmetrically, with respect to the center of the measuring tube, at a great distance from one another. The selection of the modes to be excited is made via the frequency and the phase relationship of the exciter signals that are applied to the two exciters. Deviations in the phase relationship or unequal amplitudes of the exciter signals necessarily result in the excitation of other, undesirable modes. This can lead to undetected measurement errors.

SUMMARY

It is therefore the object of the invention to remedy this situation.

The vibronic sensing element according to the invention comprises: an oscillator having at least one first measuring tube for guiding a medium; at least one electrodynamic exciter arrangement for exciting the oscillator to bring about bending vibrations of the at least one first measuring tube; at least one inlet-side sensor arrangement for detecting the bending vibrations of the at least one first measuring tube; at least one outlet-side sensor arrangement for detecting the bending vibrations of the at least one first measuring tube; and a measuring and operating circuit configured to apply at least one exciter signal to the electrodynamic exciter arrangement, detect sensor signals of the inlet-side and outlet-side sensor arrangements, and determine a density measurement value and/or a mass flow rate measurement value on the basis of the sensor signals, the electrodynamic exciter arrangement comprising a first exciter assembly, which is fastened to the at least one first measuring tube, and a second exciter assembly, in respect of which the at least one first measuring tube is to be excited such as to vibrate, the first exciter assembly having a center of gravity located, up to manufacturing tolerances, in a measuring tube transverse plane, which runs perpendicularly to the at least one first measuring tube and in respect of which the at least one first measuring tube has a substantially mirror symmetric profile, the electrodynamic exciter arrangement comprising a first electrodynamic exciter, the exciter arrangement comprising a second electrodynamic exciter and at least one first compensation mass body, the first exciter assembly comprising a first component of the first electrodynamic exciter and a first component of the second electrodynamic exciter and the first compensation mass body, the second exciter assembly comprising a second component of the first electrodynamic exciter and a second component of the second electrodynamic exciter, the first electrodynamic exciter being configured to exert an exciter force on the at least one first measuring tube, said exciter force acting between the first component and the second component of the first electrodynamic exciter, an effective center of the first exciter force being located in the measuring tube transverse plane (EQ), the second electrodynamic exciter being configured to exert a second exciter force on the at least one measuring tube, said second exciter force acting between the first component and the second component of the second electrodynamic exciter, an effective center of the second exciter force being located outside the measuring tube transverse plane, the measuring and operating circuit being configured to apply a first exciter signal, the frequency of which corresponds to a present eigenfrequency of a symmetric vibration mode of the oscillator, only to the first electrodynamic exciter, and the measuring and operating circuit (70) being configured to apply a second exciter signal, the frequency of which corresponds to a present eigenfrequency of an antisymmetric vibration mode of the oscillator, only to the second electrodynamic exciter.

In the case of an exciter which has a coaxial arrangement of a rotationally-symmetrical magnet with a rotationally-symmetrical coil, the effective center of the exciter force lies on the common axis of the rotational symmetry. In other embodiments, the center of the exciter force for an electromagnetic exciter is to be determined as the center of gravity of the integral of the force density between magnet and coil.

In one development of the invention, the first component of the second electrodynamic exciter has a first center of gravity, wherein the first compensation mass body has a second center of gravity, wherein a distance of a common center of gravity of the first center of gravity and of the second center of gravity from the measuring tube transverse plane is not more than 5%, especially not more than 2% of the distance of the first center of gravity from the second center of gravity.

In one development of the invention, the total mass of the first component of the second electrodynamic exciter and of the first compensation mass body is not more than one times, especially not more than half of, the mass of the first component of the first electrodynamic exciter.

In one development of the invention, the at least one first measuring tube has a free vibration length which extends between an inlet-side fixation of the measuring tube and an outlet-side fixation of the measuring tube, wherein the center of the second exciter force FE2 is spaced apart from the measuring tube transverse plane (EQ) by no less than 1% of the free vibration length and no more than 10% of the free vibration length.

In one development of the invention, one of the components of the first electrodynamic exciter has a first exciter coil, wherein one of the components of the second electrodynamic exciter has a second exciter coil, wherein the inductance of the first exciter coil is not less than two times, especially not less than four times, the inductance of the second exciter coil.

In one development of the invention, the other of the components of the first electrodynamic exciter has a first magnet, wherein the other components of the second electrodynamic exciter comprises a second magnet, wherein an orthogonal projection of the first magnet and an orthogonal projection of the second magnet onto a plane running perpendicularly to the vibration direction of the at least one measuring tube overlap with an orthogonal projection of the first exciter coil and an orthogonal projection of the second exciter coil, respectively, onto this plane.

In one development of the invention, the area of the overlapping orthogonal projections of the components of the first electrodynamic exciter is at least two times, for example at least three times and especially at least four times, the area of the overlapping orthogonal projections of the components of the second electrodynamic exciter.

In one development of the invention, the distance of the second electrodynamic exciter from the sensor arrangement closest thereto is not less than four times, especially not less than eight times, the distance of the second electrodynamic exciter from the first electrodynamic exciter.

In one development of the invention, a principal axis of inertia of the first exciter assembly runs in the measuring tube transverse plane (EQ).

In one development of the invention, the first exciter assembly is fastened to the at least one measuring tube by means of a joint, wherein the measuring tube transverse plane (EQ) runs through a center of gravity of the joint.

In one development of the invention, the first exciter assembly has a first carrier body on which the second exciter coil and the at least one first compensation mass body are arranged, wherein the first carrier body is symmetrical with respect to the measuring tube transverse plane EQ.

In one development of the invention, the oscillator also has a second measuring tube, wherein the first measuring tube and the second measuring tube have a mirror symmetric profile relative to one another with respect to a sensing element longitudinal plane, wherein the sensing element longitudinal plane runs perpendicularly to the measuring tube transverse plane EQ.

In one development of the invention, the second exciter assembly is fastened to the second measuring tube opposite the first exciter assembly, wherein the center of gravity of the second exciter assembly lies in the measuring tube transverse plane EQ up to manufacturing tolerances.

In one development of the invention, a principal axis of inertia of the second exciter assembly runs in the measuring tube transverse plane EQ.

In one development of the invention, the second exciter assembly has a second carrier body on which the second magnet and a second compensation mass body are arranged, wherein the second carrier body is symmetrical with respect to the measuring tube transverse plane EQ.

In one development of the invention, if the sensing element comprises only a single measuring tube, the exciter assembly carrying the magnets is arranged on the measuring tube, while the exciter assembly carrying the coils is fixed to a comparatively stiff carrier tube or frame of the sensing element. With this arrangement, the measuring tube is to be excited such as to vibrate relative to the carrier tube or frame. In this way, the wiring along the measuring tube is omitted. The same applies to the arrangement of the sensors.

In one development of the invention, the measuring and operating circuit is configured to excite the first symmetric vibration mode and the first antisymmetric vibration mode, to determine the eigenfrequencies of the first symmetric vibration mode and of the first antisymmetric vibration mode, and on the basis of the eigenfrequencies of the first symmetric vibration mode and of the first antisymmetric vibration mode a density measurement value or mass flow measurement value for a medium guided in the measuring tube, wherein the density measurement value or the mass flow measurement value is corrected with respect to a resonator effect due to gas content of the medium.

BRIEF DESCRIPTION OF THE DRAWINGS

The present disclosure is now explained in more detail on the basis of the exemplary embodiments shown in the figures.

In the figures.

DETAILED DESCRIPTION

Figure 1A:
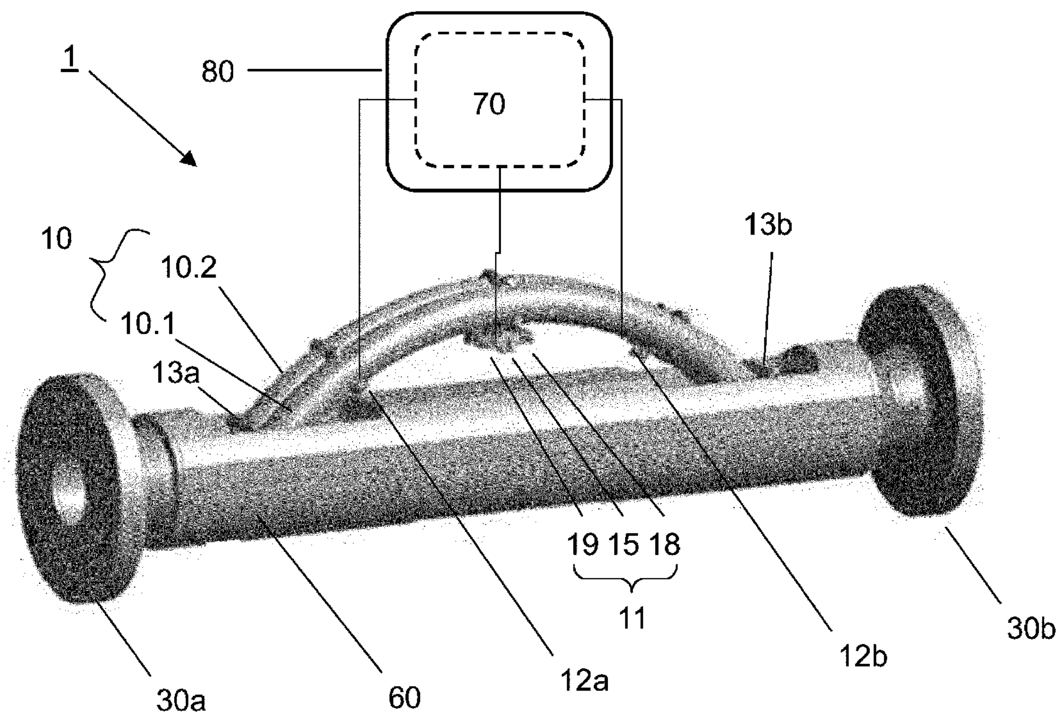
FIG. 1*a* shows a representation of an exemplary embodiment of a sensing element according to the present disclosure.

The sensing element 1 shown in FIG. 1*a* for measuring mass flow and density comprises an oscillator 10, which has two curved measuring tubes 10.1, 10.2 running substantially in parallel, and an exciter arrangement 11, which acts between the measuring tubes 10 in order to excite them to perform bending vibrations relative to each other. Furthermore, the sensing element 1 has two sensor arrangements 12*a*, 12*b* arranged symmetrically with respect to the measuring tube transverse plane in order to detect the measuring tube vibrations as a relative movement of the measuring tubes 10.1, 10.2, which vibrate relative to one another. The measuring tubes 10.1, 10.2 extend between two flow dividers (not shown), which fluidically combine the measuring tubes 10.1, 10.2 and are respectively connected to a flange 30*a*, 30*b*, which serves for the installation of the sensing element 1 in a pipeline. The measuring tubes 10.1, 10.2 are also connected to one another by means of at least one coupling plate 13*a*, 13*b* on each of the inlet side and the outlet side, and the free vibration length I of the measuring tubes 10.1, 10.2 is defined by the coupling plates 13*a*, 13*b*. A rigid carrier tube 60 which connects the flow dividers to one another extends between said flow dividers in order to suppress vibrations of the flow dividers counter to one another in the frequency range of the bending vibration modes of the oscillator 10 counter to one another. The carrier tube 60 also carries an electronics housing 80 (shown only schematically herein), in which a measuring and operating circuit 70 configured to operate the sensing element and to perform the method according to the invention is contained.

The exciter arrangement 11 is arranged on the measuring tubes 10.1, 10.2 in such a way that the center of mass of the exciter assembly overall lies in a measuring tube transverse plane EQ which intersects the measuring tubes perpendicularly and in respect of which each of the measuring tubes has a mirror symmetric profile. The exciter arrangement comprises a first electrodynamic exciter 15, the exciter force of which acts between the measuring tubes symmetrically with respect to the measuring tube transverse plane in order to excite symmetric bending vibration modes of the measuring tubes 10.1, 10.2. The exciter arrangement also comprises a second electrodynamic exciter 18, the exciter force of which acts between the measuring tubes parallel to the measuring tube transverse plane and at an offset to the measuring tube transverse plane of approximately 5% in the longitudinal direction of the measuring tubes in order to excite antisymmetric bending vibration modes of the measuring tubes 10.1, 10.2. The exciter arrangement moreover has a compensation mass 19 for compensating the mass of the second electrodynamic exciter 18 in order to keep the center of mass of the exciter arrangement in the measuring tube transverse plane.

Details regarding the exciter arrangement 11 are now explained with reference to FIGS. 1*b* and 1*c*.

As is customary, the exciter arrangement 11 and the sensor arrangements 12*a*, 12*b* have electrodynamic transducers; for each of these transducers, a magnet is arranged on one of the measuring tubes and a coil is arranged on the other. This principle is known per se and does not need to be explained in more detail here. The special feature of the sensing element according to the invention is that, in addition to the excitation of symmetric bending vibration modes, the exciter arrangement 11 also allows excitation of antisymmetric bending vibration modes of the oscillator or of the measuring tubes of the oscillator, and the exciter arrangement is nevertheless balanced with respect to its mass distribution. For this purpose, the exciter arrangement 11 comprises a first exciter assembly 11.1 on a first measuring tube 10.1, as illustrated in FIG. 1*b*, and a second exciter assembly 11.2, which is arranged opposite the first exciter assembly 11.1 on a second measuring tube 10.2, as FIG. 1*c* shows.

Figure 1B:
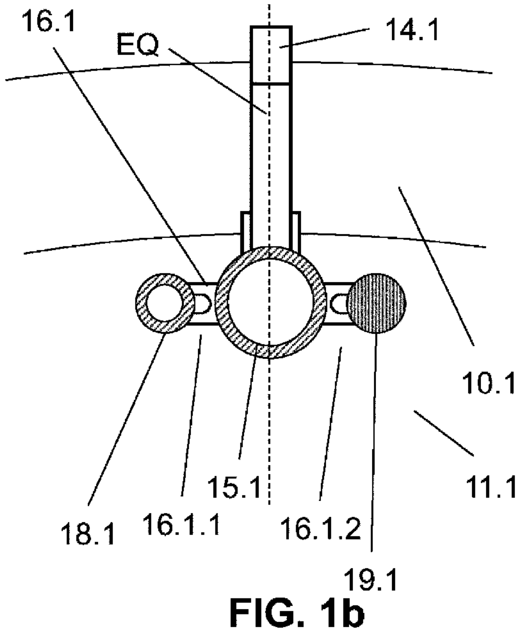
FIG. 1*b* shows a schematic side view of a first exciter assembly of the sensing element of FIG. 1*a* as viewed from the direction of the second exciter assembly.

The first exciter assembly 11.1 shown in FIG. 1*b* comprises a first ring segment 14.1 which partially surrounds the first measuring tube 10.1 symmetrically with respect to the measuring tube transverse plane and is integrally joined to the first measuring tube 10.1—for example, by brazing. The first ring segment 14.1 holds a first carrier body 16.1, which in particular is planar and which runs substantially perpendicularly to the measuring tube transverse plane and is symmetrical with respect to the measuring tube transverse plane. The first carrier body 16.1 has a slotted first exciter component carrier 16.1.1 and a slotted first compensation mass carrier 16.1.2 and carries a first exciter coil 15.1 of the first electrodynamic exciter 15 at the center of said first carrier body. The first exciter component carrier 16.1.1 carries a second exciter coil 18.1 of the second electrodynamic exciter 18, said second exciter coil being positioned by means of a pin that engages in a slot of the first exciter component carrier 16.1.1 and being fixed to said first exciter component carrier by, for example, soldering, gluing or screwing. The first compensation mass carrier 16.1.2 carries a first compensation mass body 19.1, said first compensation mass body being positioned by means of a pin that engages in a slot of the first compensation mass carrier 16.1.2 and being fixed to said first compensation mass carrier by, for example, soldering, gluing or screwing. The first compensation mass body 19.1 is matched to the mass of the second exciter coil 18.1 in such a way that the common center of gravity lies in the measuring tube transverse plane. In particular, the first compensation mass body 19.1 and the second exciter coil 18.1 have the same mass. A principal axis of inertia of the first exciter assembly 11.1 runs in the measuring tube transverse plane EQ.

Figure 1C:
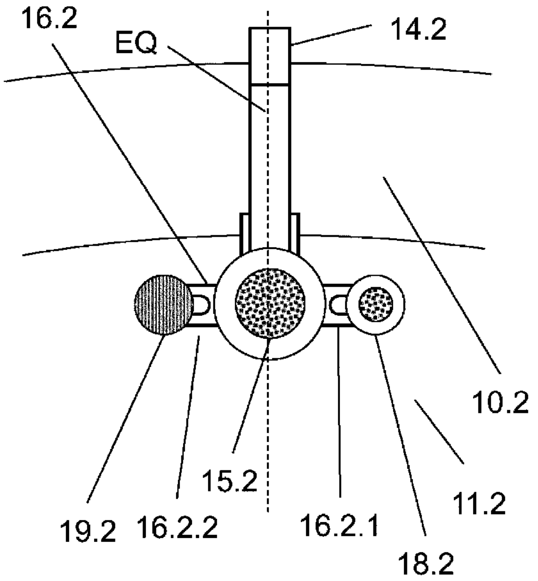
FIG. 1*c* shows a schematic side view of a second exciter assembly of the sensing element of FIG. 1*a* as viewed from the direction of the first exciter assembly.

The second exciter assembly 11.2 shown in FIG. 1*c* comprises a second ring segment 14.2 which partially surrounds the second measuring tube 10.2 symmetrically with respect to the measuring tube transverse plane and is integrally joined to the second measuring tube 10.2—for example, by brazing. The second ring segment 14.2 holds a second carrier body 16.2, which in particular is planar and which runs substantially perpendicularly to the measuring tube transverse plane and is symmetrical with respect to the measuring tube transverse plane. The second carrier body 16.2 has a slotted second exciter component carrier 16.2.1 and a slotted second compensation mass carrier 16.2.2 and carries a first exciter magnet 15.2 of the first electrodynamic exciter 15 at the center of said second carrier body. The second exciter component carrier 16.2.1 carries a second exciter magnet 18.2 of the second electrodynamic exciter 18, said second exciter magnet being positioned by means of a pin that engages in a slot of the second exciter component carrier 16.2.1 and being fixed to said second exciter component carrier by, for example, soldering, gluing or screwing. The second compensation mass carrier 16.2.2 carries a second compensation mass body 19.2, said second compensation mass body being positioned by means of a pin that engages in a slot of the second compensation mass carrier 16.2.2 and being fixed to said second compensation mass carrier by, for example, soldering, gluing or screwing. The second compensation mass body 19.2 is matched to the mass of the second exciter magnet 18.2 in such a way that the common center of gravity lies in the measuring tube transverse plane EQ. In particular, the second compensation mass body 19.2 and the second exciter magnet 18.2 have the same mass. A principal axis of inertia of the second exciter assembly 11.2 runs in the measuring tube transverse plane EQ.

The second ring segment 14.2 is in particular structurally identical to the first ring segment 14.1, and the second carrier body 16.2 is in particular structurally identical to the first carrier body 16.1.

The principal axes of inertia of the first exciter assembly 11.1 and of the second exciter assembly 11.2 in the measuring tube transverse plane run parallel to one another, and in particular mirror-symmetrically to one another, with respect to a sensing element longitudinal plane which runs between the two measuring tubes 10.1, 10.2, wherein the two measuring tubes are arranged mirror-symmetrically to one another with respect to the sensing element longitudinal plane.

The first exciter coil 15.1 and the second exciter coil 18.1 are each configured to be fed by the measuring and operating circuit 70 with an alternating current signal which is specific to the exciter coil and the frequency of which corresponds to the present eigenfrequency of a bending vibration mode to be excited. For the first exciter coil 15.1 these are the frequencies of the symmetric bending vibration modes, and for second exciter coil 18.1 these are the frequencies of the antisymmetric bending vibration modes. Of course, alternating current signals of different frequencies of the symmetry class in question can also be superimposed, for example with the present eigenfrequencies of the first symmetric and the second symmetric bending vibration mode for the first exciter coil 15.1 and with the present eigenfrequencies of the first antisymmetric bending vibration mode and the second antisymmetric bending vibration mode for the second exciter coil 18.1. The resulting magnetic fields produce alternating attractive and repulsive forces on the corresponding exciter magnet 15.2, 18.2 which lies opposite the field-generating exciter coil, and as a result the two measuring tubes 10.1, 10.2 of the oscillator are caused to vibrate relative to each other in the selected bending vibration modes.

The exciter magnets 15.2, 18.2 and the exciter coils 15.1, 18.1 as well as the two compensation mass bodies 19.1, 19.2 are preferably rotationally symmetrical, with the axis of rotation running substantially in the direction of the vibrations of the measuring tubes. In particular, the exciter magnets 15.2, 18.2, the exciter coils 15.1, 18.1, and the two compensation mass bodies 19.1, 19.2 have cylindrical symmetry, at least in sections.

Figure 2:
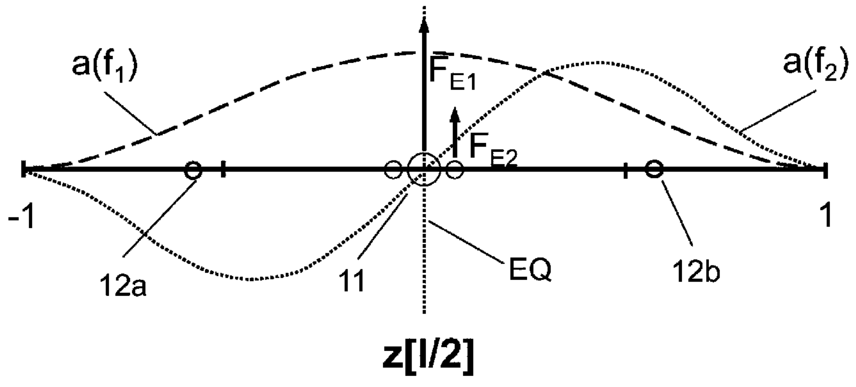
FIG. 2 shows a graph of the vibration modes of a sensing element.

The mode-dependent deflection of a measuring tube is shown schematically in FIG. 2. The curve a ($f_1$) here shows the bending line of a measuring tube for the first symmetric vibration mode, which is also called the drive mode or $f_1$ mode. The curve a ($f_2$) shows the bending line of the measuring tube for the first antisymmetric vibration mode, in which the measuring tube is deflected by the Coriolis forces if a mass flow flows through the measuring tube that is vibrating with the first symmetric vibration mode. The first antisymmetric vibration mode has a vibration node in the tube center at z=0 in the longitudinal direction of the measuring tube. An exciter at this position would not be able to excite a vibration of the first antisymmetric vibration mode. Therefore, the second electrodynamic exciter 18 is positioned in such a way here that its exciter force $F_{E2}$ acts between the measuring tubes at an offset to the measuring tube transverse plane of approximately 2.5% of the measuring tube length, i.e., approximately 5% of half the measuring tube length. The measuring tube length is the length of a measuring tube central line following the curved profile of a measuring tube between the coupling plates 13*a*, 13*b* shown in FIG. 1*a*. In the offset position, the second electrodynamic exciter 18 can excite the first antisymmetric vibration mode if it applies an exciter force $F_{E2}$ at the resonance frequency of the first antisymmetric vibration mode.

The first antisymmetric vibration mode has to be excited only so much that the value of its eigenfrequency can be determined, which is possible already at a minimum vibration amplitude. The second electrodynamic exciter 18 can therefore be dimensioned much smaller and lighter than the first electrodynamic exciter 15, with which the first symmetric bending vibration mode, i.e., the so-called bending vibration utilization mode, is to be excited.

The positions of the sensor arrangements 12*a*, 12*b* are selected symmetrically, in the longitudinal direction z, with respect to the measuring tube center of the measuring tubes, such that the deflections of the vibration sensors produce a sufficient measurement signal in the case of both vibrations in the drive mode and the first antisymmetric vibration mode.

Figure 3:
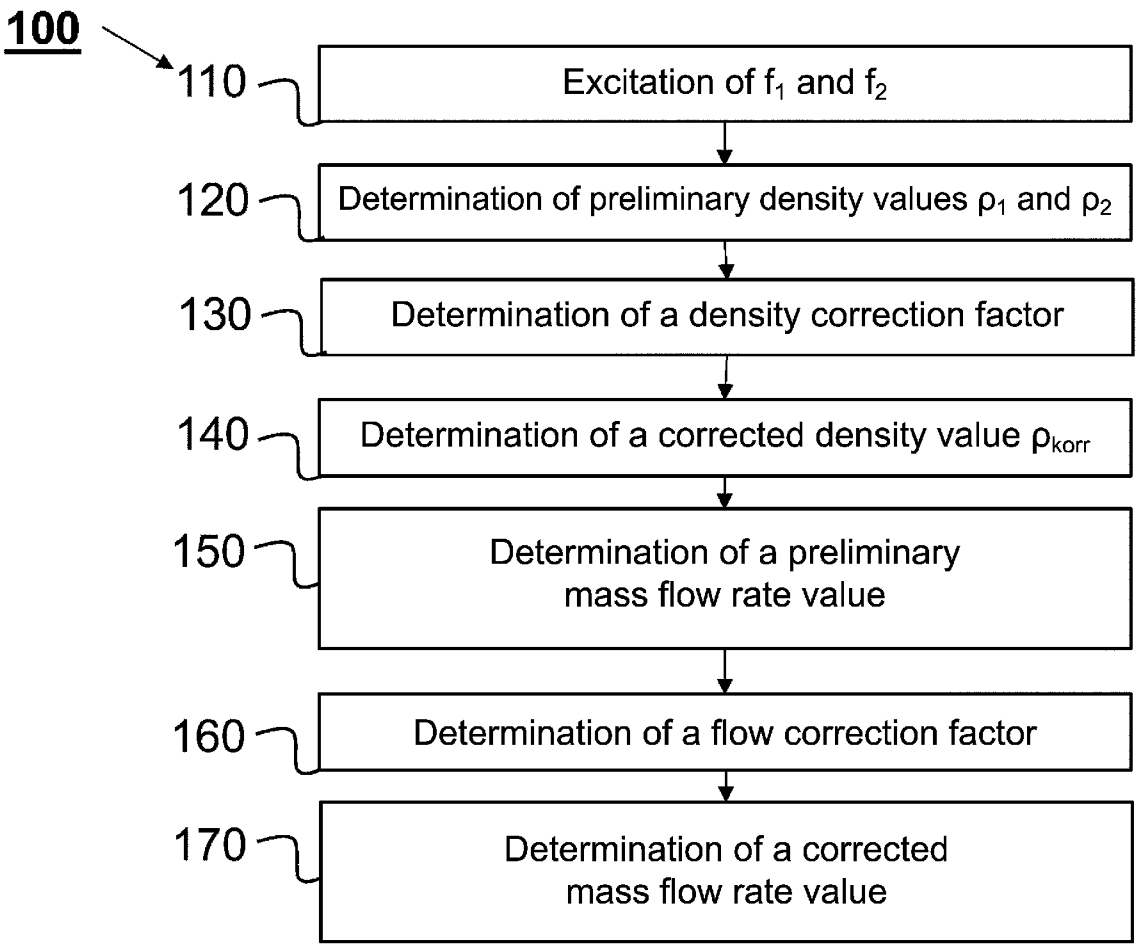
FIG. 3 shows a flow chart for determining the density and mass flow of a compressible medium using the sensing element according to the present disclosure.

The measuring and operating circuit is configured to excite the first symmetric vibration mode and the first antisymmetric vibration mode by feeding the respectively associated exciter coil with an exciter current, to determine the eigenfrequencies of the first symmetric vibration mode and of the first antisymmetric vibration mode, and on the basis of the eigenfrequencies of the first symmetric vibration mode and of the first antisymmetric vibration mode a density measurement value or mass flow measurement value for a medium guided in the measuring tube, the density measurement value or the mass flow measurement value being corrected with respect to a resonator effect due to gas content of the medium. The influence of this so-called resonator effect can be corrected by detecting the eigenfrequencies of two vibration modes, wherein, essentially, a sound velocity of the medium is determined for which corresponding density measurement values for the medium result from the two eigenfrequencies. Details for this are disclosed, for example, in DE 10 2015 122 661 A1, wherein the first and second symmetric vibration modes are to be evaluated according to the teaching described therein. With reference to FIG. 3, the method 100 is now explained, for the implementation of which the measuring and operating circuit is configured. In a first step 110, the first symmetric and the first antisymmetric vibration mode are excited, i.e., the $f_1$ mode and the $f_2$ mode. In a second step 120, a preliminary density measurement value is in each case determined based upon the eigenfrequencies of the excited modes $\rho_1$. $\rho_2$. In the case of incompressible media, the two density measurement values substantially correspond. If deviations are given, a correction factor is determined in the next step 130, which correction factor depends upon the sound velocity of the compressible medium. Accordingly, as disclosed in DE 10 2015 122 661 A1, first the sound velocity is determined, which leads to the observed ratio of the preliminary density measurement values. On the basis of the sound velocity and one of the eigenfrequencies, a density error and a correction factor can then be determined, by means of which a corrected density measurement value $\rho_{korr}$ is then determined in the next step 140.

To provide a correct mass flow rate measurement value, a preliminary mass flow rate measurement value 150 is first determined. In a next step 160, a flow correction factor is determined on the basis of the density error or density correction factor, as is also disclosed in DE 10 2015 122 661 A1. In a last step 170, a correct mass flow rate measurement value is determined, in which the preliminary mass flow rate measurement value is corrected with the correction factor.

The invention claimed is:

1. A vibronic sensing element, comprising:

an oscillator having a first measuring tube for guiding a medium;

an electrodynamic exciter arrangement for exciting the oscillator to bring about bending vibrations of the first measuring tube;

an inlet-side sensor arrangement for detecting the bending vibrations of the first measuring tube;

an outlet-side sensor arrangement for detecting the bending vibrations of the at least one first measuring tube; and a measuring and operating circuit configured to apply an exciter signal to the electrodynamic exciter arrangement, to detect sensor signals of the inlet-side and the outlet-side sensor arrangements, and to determine a density measurement value and/or a mass flow rate measurement value on the basis of the detected sensor signals, wherein the electrodynamic exciter arrangement includes a first exciter assembly fastened to the first measuring tube and a second exciter assembly, wherein the first exciter assembly has a center of gravity located in a measuring tube transverse plane, that is perpendicular to the first measuring tube, wherein the first measuring tube has a mirror symmetric profile with respect to the measuring tube transverse plane, wherein the electrodynamic exciter arrangement further includes a first electrodynamic exciter, wherein the electrodynamic exciter arrangement further includes a second electrodynamic exciter and a first compensation mass body, wherein the first exciter assembly includes a first component of the first electrodynamic exciter and a first component of the second electrodynamic exciter and the first compensation mass body, wherein the second exciter assembly includes a second component of the first electrodynamic exciter and a second component of the second electrodynamic exciter, wherein the first electrodynamic exciter is configured to exert a first exciter force on the first measuring tube, wherein the first exciter force acts between the first component and the second component of the first electrodynamic exciter, wherein an effective center of the first exciter force is in the measuring tube transverse plane, wherein the second electrodynamic exciter is configured to exert a second exciter force on the first measuring tube, wherein the second exciter force acts between the first component and the second component of the second electrodynamic exciter, wherein an effective center of the second exciter force is outside the measuring tube transverse plane, wherein the measuring and operating circuit is configured to apply a first exciter signal, having a frequency corresponding to a present eigenfrequency of a symmetric vibration mode of the oscillator, to the first electrodynamic exciter, and wherein the measuring and operating circuit is further configured to apply a second exciter signal, having a frequency corresponding to a present eigenfrequency of an antisymmetric vibration mode of the oscillator, to the second electrodynamic exciter.

2. The vibronic sensing element according to claim 1, wherein the first component of the second electrodynamic exciter has a first center of gravity, wherein the first compensation mass body has a second center of gravity, wherein a distance of a common center of gravity of the first center of gravity and of the second center of gravity from the measuring tube transverse plane is not more than 5% of the distance of the first center of gravity from the second center of gravity.

3. The vibronic sensing element according to claim 2, wherein a combined mass of the first component of the second electrodynamic exciter and the first compensation mass body is not more than a mass of the first component of the first electrodynamic exciter with respect to the symmetry axis of the anti symmetric vibration mode.

4. The vibronic sensing element according to claim 1, wherein the first measuring tube has a free vibration length which extends between an inlet-side fixation of the measuring tube and an outlet-side fixation of the measuring tube, wherein the effective center of the second exciter force is spaced apart from the measuring tube transverse plane by no less than 1% of the free vibration length and no more than 10% of the free vibration length.

5. The vibronic sensing element according to claim 4, wherein an area of overlapping orthogonal projections of the components of the first electrodynamic exciter is at least two times an area of overlapping orthogonal projections of the components of the second electrodynamic exciter.

6. The vibronic sensing element according to claim 1, wherein one of the components of the first electrodynamic exciter has a first exciter coil, and wherein one of the components of the second electrodynamic exciter has a second exciter coil, and wherein an inductance of the first exciter coil is not less than two times an inductance of the second exciter coil.

7. The vibronic sensing element according to claim 6, wherein the other of the components of the first electrodynamic exciter has a first magnet, and wherein the other components of the second electrodynamic exciter includes a second magnet, wherein an orthogonal projection of the first magnet and an orthogonal projection of the second magnet onto a plane running perpendicularly to a vibration direction of the first measuring tube overlap with an orthogonal projection of the first exciter coil and an orthogonal projection of the second exciter coil, respectively, onto this plane.

8. The vibronic sensing element according to claim 7, wherein the second exciter assembly has a second carrier body on which the second magnet and a second compensation mass body are arranged, and wherein the second carrier body is symmetrical with respect to the measuring tube transverse plane.

9. The vibronic sensing element according to claim 1, wherein a distance of the second electrodynamic exciter from the sensor arrangement closest thereto is not less than four times a distance of the second electrodynamic exciter from the first electrodynamic exciter.

10. The vibronic sensing element according to claim 1, wherein a principal axis of inertia of the first exciter assembly runs in the measuring tube transverse plane.

11. The vibronic sensing element according to claim 1, wherein the first exciter assembly is fastened to the first measuring tube by a joint, wherein the measuring tube transverse plane runs through a center of gravity of the joint.

12. The vibronic sensing element according to claim 1, wherein the first exciter assembly has a first carrier body on which the second exciter coil and the at least one first compensation mass body are arranged, wherein the first carrier body is symmetrical with respect to the measuring tube transverse plane.

13. The vibronic sensing element according to claim 1, wherein the oscillator further has a second measuring tube, wherein the first measuring tube and the second measuring tube have a mirror symmetric profile relative to one another with respect to a sensing element longitudinal plane, wherein the sensing element longitudinal plane runs perpendicularly to the measuring tube transverse plane.

14. The vibronic sensing element according to claim 13, wherein the second exciter assembly is fastened to the second measuring tube opposite the first exciter assembly, and wherein a center of gravity of the second exciter assembly lies in the measuring tube transverse plane.

15. The vibronic sensing element according to claim 14, wherein a principal axis of inertia of the second exciter assembly runs in the measuring tube transverse plane.

16. The vibronic sensing element according to claim 1, wherein the measuring and operating circuit is configured to excite the first symmetric vibration mode and the first antisymmetric vibration mode, to determine the eigenfrequencies of the first symmetric vibration mode and of the first antisymmetric vibration mode, and on the basis of the eigenfrequencies of the first symmetric vibration mode and of the first antisymmetric vibration mode a density measurement value or mass flow measurement value for a medium guided in the measuring tube, wherein the density measurement value or the mass flow measurement value is corrected with respect to a resonator effect due to gas content of the medium.

* * * * *